E. F. PRICE.
ALFALFA HARROW.
APPLICATION FILED OCT. 18, 1909.
942,516.
Patented Dec. 7, 1909.
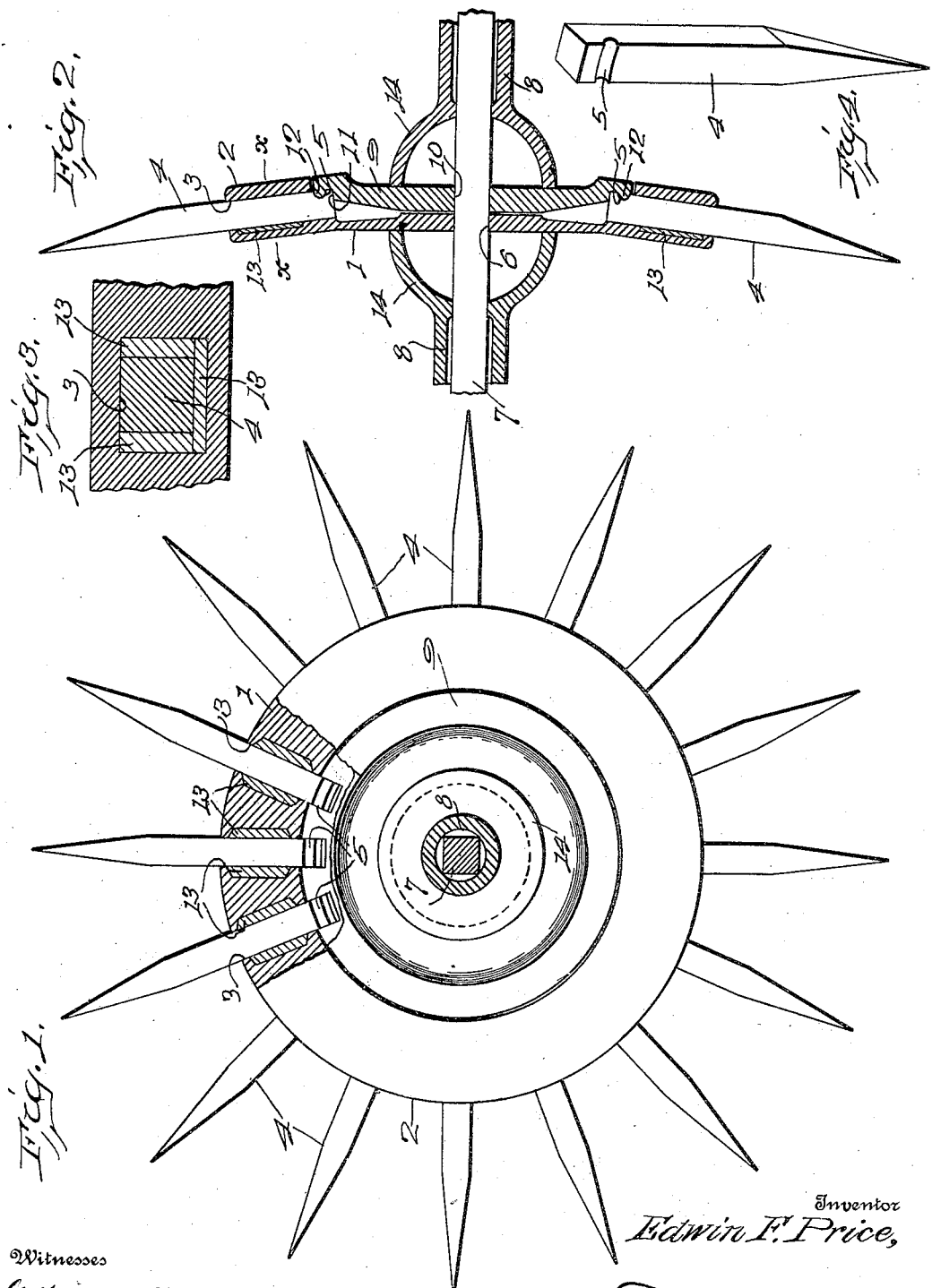
Inventor
Edwin F. Price,
Witnesses
G. Howard Walmsley.
Edward Reed.
By
Attorney

UNITED STATES PATENT OFFICE.

EDWIN F. PRICE, OF UPPER SANDUSKY, OHIO, ASSIGNOR TO THE OHIO MANUFACTURING COMPANY, OF UPPER SANDUSKY, OHIO, A CORPORATION OF OHIO.

ALFALFA-HARROW.

942,516.

Specification of Letters Patent. Patented Dec. 7, 1909.

Application filed October 18, 1909. Serial No. 523,119.

*To all whom it may concern:*

Be it known that I, EDWIN F. PRICE, a citizen of the United States, residing at Upper Sandusky, in the county of Wyandot and State of Ohio, have invented certain new and useful Improvements in Alfalfa-Harrows, of which the following is a specification, reference being had therein to the accompanying drawings.

This invention relates to alfalfa harrows, and more particularly to the spike-toothed disks of which these harrows are built up.

The object of the invention is to provide a disk of this character in which the teeth can be readily inserted and removed and in which they will be rigidly held against movement in any direction after they have been inserted; to provide means for clamping the teeth in position without the use of bolts; to provide means for retaining the teeth in their respective positions while the device is being assembled; and to prevent the rattling of the teeth in the disks.

With these and other objects in view my invention consists in certain novel features and in certain combinations and arrangements of parts hereinafter to be described, and then more particularly pointed out in the claims.

In the accompanying drawings, Figure 1 is a side elevation, partly broken away, of a spike-toothed disk embodying my invention; Fig. 2 is a sectional view, taken centrally through such a disk; Fig. 3 is a transverse, sectional view, taken on the line x x of Fig. 2; and Fig. 4 is a detail view of one of the teeth.

The harrow, of which this disk forms a part, is not a part of the present invention and is not here shown in its entirety as such a showing is not necessary to an understanding of the invention and the harrow is well known. As shown in these drawings, the disk comprises two portions, a main or body portion 1, which is preferably concave and has on its convex side and near the outer edge thereof an annular projection or enlargement 2 which is preferably cast integral with the body portion of the disk and has formed therein a series of openings or sockets 3 arranged radially about the circumference of the disk and adapted to receive the teeth 4. The shape of the teeth 4 is such that they fit snugly within the sockets 3 and each tooth is provided near its inner end with a transverse groove 5 which is preferably curved to conform to the arc of a circle described from the center of the disk. The inner ends of the teeth preferably project beyond the inner edge of the annular enlargement 2 of the body portion of the disk and the grooves 5 are formed in those portions of the teeth which project beyond said enlargement. The body portion 1 of the disk has a squared opening 6 arranged centrally thereof and adapted to receive the gang bolt 7 which is of ordinary construction, upon which the several disks are mounted and upon which they are spaced apart suitable distances and retained in their respective positions by means of spacing sleeves or spools 8.

The second portion of the disk consists of a clamping plate 9 which is of such a size and shape as to fit within the annular enlargement 2 of the body portion of the disk and is provided with a central opening 10 to permit the same to be mounted on the gang-bolt 7. The inner face of the clamping plate is cut away near its outer edge to form an annular shoulder 11 against which the inner ends of the teeth 4 bear. This clamping plate also has an annular rib 12 arranged between the shoulder 11 and the outer edge of the plate, this rib being of a size and curvature to enable the same to fit within the recesses 5 of the several teeth and thus securely lock the teeth against longitudinal movement and clamp the same against the side of the socket.

Each of the apertures or sockets formed in the annular enlargement 2 of the body portion of the disk has its central portion hollowed out or notched to form a cavity or cavities between the ends of said sockets. These cavities are adapted to receive blocks of wood or wedges 13 which are inserted in the cavities before the tooth is placed in the socket. The tooth is then inserted in the socket and driven into place from the inside. The wedges thus grip the sides of the tooth and hold each tooth in place until the other teeth have been inserted and the clamping plate 9 placed in position to permanently secure the teeth in the sockets. Further, these wooden wedges serve to prevent any rattling of the tooth should it not fit snugly within its socket. In the present instance I have shown these wedges arranged on three sides of the tooth, but, obviously, the number and arrangement of the wedges can be varied.

The clamping plate 9 is secured to the body portion 1 of the disk by means of the spacing sleeves or spools 8, and, in order that these spools may have a better clamping effect, I have enlarged the ends thereof adjacent to the disk. In the present instance this enlargement is semispherical in shape, as shown at 14, and of such a size as to engage the faces of the body portion of the disk and of the clamping plate, respectively, at a considerable distance from the center thereof, thus securing a greatly increased clamping effect and serving to lock the clamping plate rigidly in position.

It will be understood that the spacing sleeves are caused to bear strongly against the disk by assembling the same in the usual manner in which the nut on the end of the gang-bolt clamps the several spacing sleeves and their respective disks rigidly together, forming a compact, unitary structure.

It will be apparent from the foregoing description that I have provided a spike-toothed disk which is very simple in its construction, is easily and quickly assembled, and, when assembled, the several parts thereof are rigidly connected together and this connection is formed without bolts; and that means are provided both for holding the several teeth in their respective positions until the assembling of the device is completed and for preventing the rattling of the teeth in their sockets.

I wish it to be understood that I do not desire to be limited to the details of construction shown and described, for obvious modifications will occur to a person skilled in the art.

Having thus fully described my invention, what I claim as new and desire to secure by Letters Patent, is:—

1. In a harrow of the character described, a disk comprising a body portion, an annular projection arranged near the edge of said body portion and having a series of sockets therein, teeth arranged in the respective sockets and having transverse grooves near the inner ends thereof, a clamping plate having a rib near the edge thereof adapted to enter the grooves in said teeth, and means for securing said clamping plate to said body portion.

2. In a harrow of the character described, the combination, with a gang-bolt, of a disk comprising a body portion mounted on said gang-bolt, an annular projection arranged near the edge of said body portion on one side thereof and having a series of radially arranged sockets therein, a series of teeth mounted in the respective sockets and having transverse grooves near their inner ends, a clamping plate mounted on said gang-bolt and having a projection arranged near the edge thereof and adapted to engage the grooves in said teeth, and means for securing said clamping plate to said body portion.

3. In a harrow of the character described, the combination, with a gang-bolt, of a disk comprising a body portion mounted on said gang-bolt, an annular projection arranged near the edge of said body portion on one side thereof and having a series of radially arranged sockets therein, a series of teeth mounted in the respective sockets and having transverse grooves near their inner ends, a clamping plate mounted on said gang-bolt and having a projection arranged near the edge thereof and adapted to engage the grooves in said teeth, means for securing said clamping plate to said body portion, and spacing sleeves mounted on said gang-bolt and adapted to engage the outer faces of said body portion and said clamping plate, respectively.

4. In a harrow of the character described, the combination, with a gang-bolt, of a disk comprising a body portion mounted on said gang-bolt, an annular projection arranged near the edge of said body portion on one side thereof and having a series of radially arranged sockets therein, a series of teeth mounted in the respective sockets and having transverse grooves near their inner ends, a clamping plate mounted on said gang-bolt and having a projection arranged near the edge thereof and adapted to engage the grooves in said teeth, means for securing said clamping plate to said body portion, and spacing sleeves mounted on said gang-bolt and having the ends adjacent said disk enlarged and adapted to engage said body portion and said clamping plate, respectively, at points removed from said gang-bolt.

5. A disk of the character described comprising a body portion, a laterally extending annular projection arranged on one side thereof and having a series of radially arranged sockets, a series of teeth mounted in the respective sockets, extending beyond the inner ends thereof and having transverse grooves in said projecting portions, a clamping plate adapted to fit within said annular projection on said body portion and having a rib near the edge thereof adapted to engage the grooves in said teeth.

6. A disk of the character described comprising a body portion having a laterally extending annular enlargement formed integral therewith and having a series of apertures arranged therein, a series of teeth mounted in the respective apertures, projecting beyond the inner ends thereof and having transverse grooves in said projecting portions, a clamping plate having a projection adapted to engage said grooves, and means for securing said clamping plate in its clamping position.

7. A disk of the character described comprising a body portion having a laterally extending annular enlargement formed integral therewith and having a series of apertures arranged therein, a series of teeth mounted in the respective apertures, projecting beyond the inner ends thereof and having transverse grooves in said projecting portions, a clamping plate adapted to fit within said annular enlargement having a shoulder to engage the inner ends of said teeth, an annular rib to enter said transverse grooves, and means for securing said clamping plate within said annular enlargement.

8. A disk of the character described comprising a body portion having a laterally extending projection, an aperture formed in said projection, the wall of said aperture having a recess between the ends thereof, a wedge mounted in said recess, a tooth mounted in said aperture and engaging said wedge, and a clamping plate adapted to engage said tooth and retain the same within said socket.

In testimony whereof, I affix my signature in presence of two witnesses.

EDWIN F. PRICE.

Witnesses:
D. C. PARKER,
THOS. C. KERR.